June 24, 1930.　　　　C. R. SHORT　　　　1,768,530
FLUID CONTROL OF POWER PLANTS
Filed Dec. 27, 1927　　2 Sheets-Sheet 1

Inventor
Charles R. Short

By Blackmore, Spencer & Hirsh
Attorneys

June 24, 1930.   C. R. SHORT   1,768,530
FLUID CONTROL OF POWER PLANTS
Filed Dec. 27, 1927   2 Sheets-Sheet 2
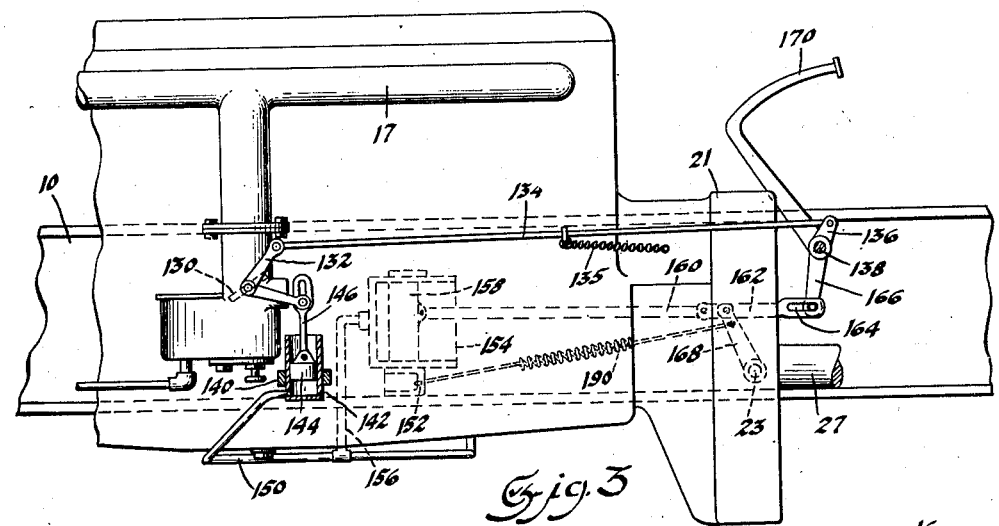
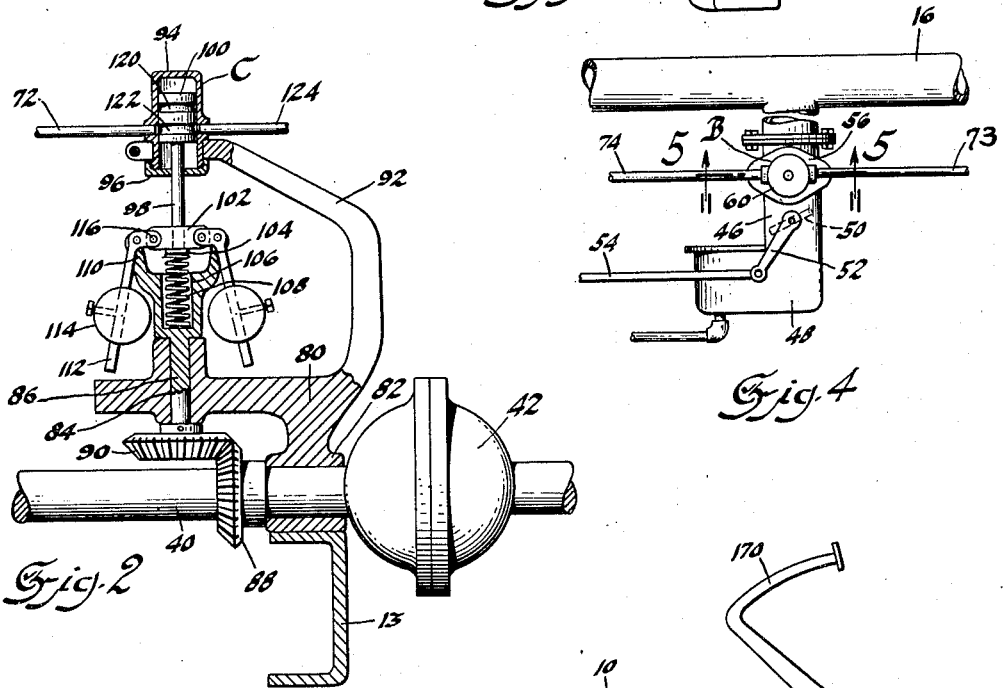
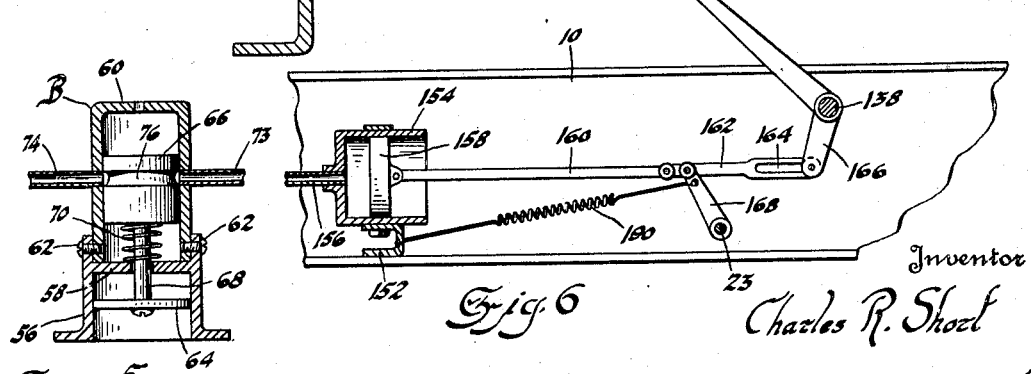
Inventor
Charles R. Short
By Blackmore, Spencer & Fink
Attorneys Patented June 24, 1930

1,768,530

UNITED STATES PATENT OFFICE

CHARLES R. SHORT, OF DETROIT, MICHIGAN, ASSIGNOR TO GENERAL MOTORS CORPORATION, OF DETROIT, MICHIGAN, A CORPORATION OF DELAWARE

FLUID CONTROL OF POWER PLANTS

Application filed December 27, 1927. Serial No. 242,926.

This invention relates to control means for two internal combustion engines arranged to apply their power to a single propeller shaft.

During the development of large passenger busses, which are being used more and more for long distance transportation, certain difficulties have arisen in the use of a single internal combustion engine. Due to the wide difference in the amount of power required on a level and on a hilly road and to the wide variations in the number of passengers carried, and also to the fact that the speed of an ordinary pleasure car must be attained, the power requirement of a vehicle of this kind is subject to a very wide variation.

In order to secure sufficient flexibility so that the car will operate efficiently with a three forward speed transmission, it is necessary to install a very large engine. While such an engine will operate efficiently in first and second gears, more power is developed than is necessary for propelling the vehicle in high speed under ordinary operating conditions on a level road, especially with a light load. Accordingly, I have in the present invention provided two small engines where one large engine is ordinarily installed. In this connection, I propose to use two six cylinder engines of the type used on pleasure cars, thus avoiding any engineering difficulties that might arise in the development of an engine of twice its power, and, by using an engine which is being manufactured in large quantities, securing the economy of manufacture which accompanies mass production.

The invention contemplates the use of two similar engines connected with a single propeller shaft. Since an internal combustion engine operates most efficiently with the throttle approximately three-fourths open, and since considerably less power is required to maintain a car at ordinary traveling speed than is needed to propel the car till its speed increases to that point, I propose that the engine be geared to the propeller shaft so that the speed of the car under ordinary conditions with the engine throttle three-fourths open approximates the desired normal operating speed, and to provide a control for one engine so that when the desired speed is attained, it will be automatically disconnected from the propeller shaft and its throttle closed. When this engine is cut out, the first engine is able to maintain the speed of the vehicle under normal operating conditions.

It is an object of the invention to provide two engines connected with a single propeller shaft, with a conventional control for one engine, and an automatic control for the second engine so constructed that when the speed of the propeller shaft increases past a certain point the second engine will be unclutched from the propeller shaft and its throttle closed, and when the speed of the first engine decreases past a certain point, the second engine will be automatically clutched to the propeller shaft and its throttle opened.

By the arrangement described, I provide a construction which supplies ample power for any ordinary low speed conditions and yet secure economy of operation by using only half the power plant under normal high speed conditions when it is unnecessary to use all the power available.

It is a further object of the invention to provide means for controlling the second engine actuated by changes in the pressure within the intake manifold of the first. It is a further object of the invention to provide such a structure in which the second engine may also be controlled manually by the operator.

Other objects and advantages of the invention will appear in the course of the following description, taken in connection with the accompanying drawing and appended claims.

In the drawing:

Figure 2 is a section on the line 2—2 of Figure 1.

Figure 3 is a side view, partly in section.

Figure 4 is a side elevation of the control mechanism of the No. 1 engine, taken as indicated by the line 4—4 of Figure 1.

Figure 5 is an enlarged section on the line 5—5 of Figure 4,

Figure 6 is a side view, partly in section, taken as indicated by the line 6—6 in Figure 1.

Figure 1:
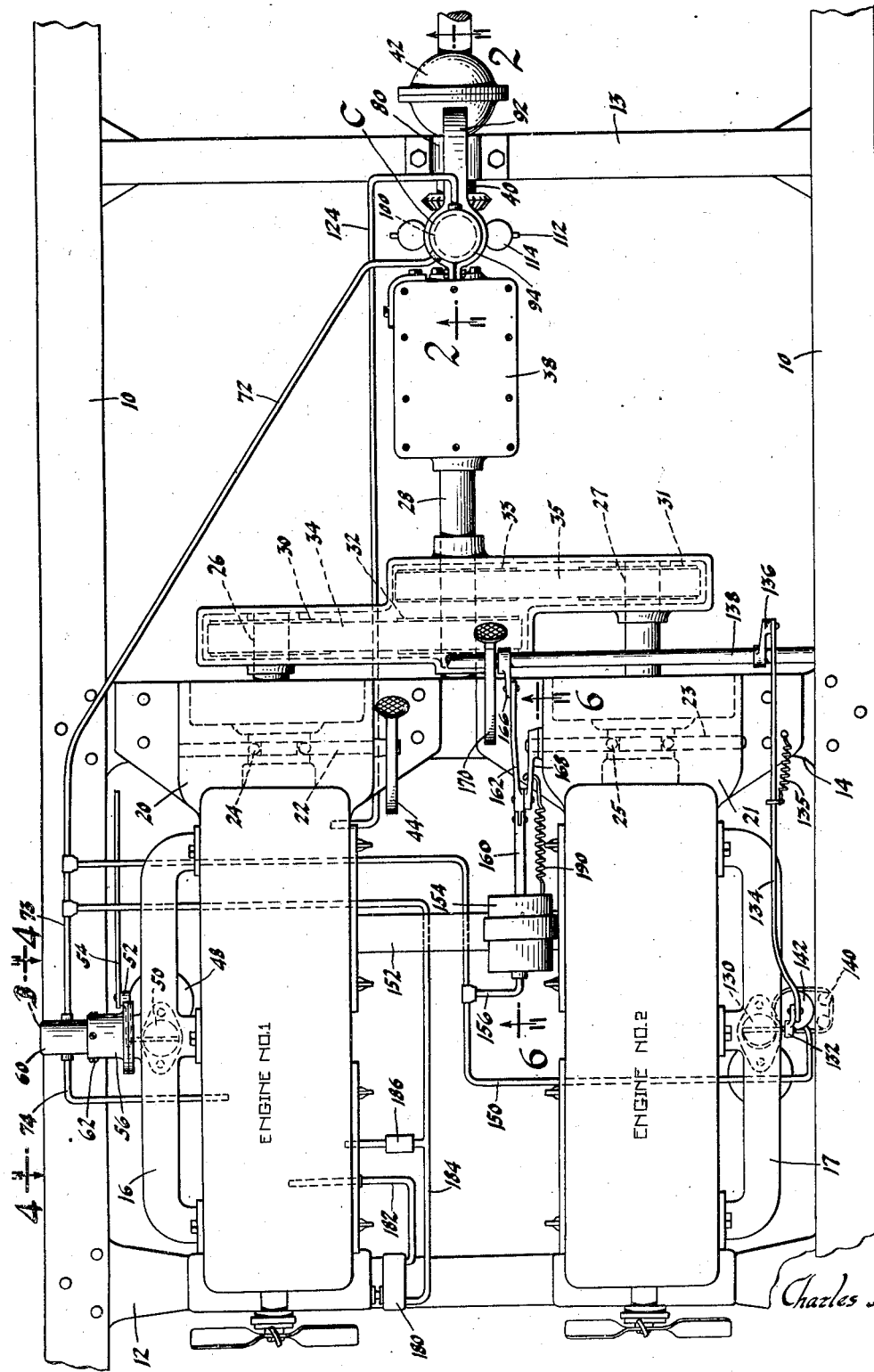
Figure 1 is a plan view of a portion of an automotive vehicle chassis provided with two engines embodying my invention.

Referring to Figure 1, I have illustrated the usual channel shaped longitudinal frame members 10, opening inward as usual, and provided with cross members 12, 13 and 14 fixed to the members 10 by rivets or otherwise. Supported on the cross members 12 and 14 are the two engines and their controlling mechanism.

The engines in the present case are of conventional construction and are equal in power and number of cylinders. Engine No. 1 is controlled manually at all times in the usual manner while engine No. 2 may be controlled automatically by the operation of No. 1 or it may be controlled manually. The only difference between the two engines, except the means for controlling the throttle of each, is that in order to provide ready access to the carburetor and adjacent parts I have arranged the intake manifold 16 of No. 1 on the right side and the intake manifold 17 of No. 2 on the left side. This arrangement is for convenience only and no other changes need be made in either engine except those necessary in so locating the intake mechanism.

On the rear of No. 1 is the clutch housing 20 provided with the usual shaft 22 carrying an upward extending fork 24 for engaging and disengaging the clutch through rocking movement of shaft 22. Power is transmitted through shaft 26 connected with the drive shaft 28 by means of sprockets 30 and 32 connected by a chain 34. No. 2 is similarly provided with a clutch housing 21, clutch operating shaft 23 and operating fork 25. The shaft 27 is connected with drive shaft 28 by means of sprockets 31 and 33 connected by a chain 35. Drive shaft 28 extends rearward into the transmission casing 38 containing the usual transmission mechanism. Extending rearward from the transmission casing is the propeller shaft 40 provided with the usual universal joint 42. Clutch operating shaft 22 is provided with a foot pedal 44 for engaging and disengaging the clutch of No. 1, this clutch normally remaining engaged.

Referring to Figures 1 and 4, I have illustrated the riser 46 extending downward from manifold 16 and connected with the carburetor 48. The usual throttle valve 50 in the riser 46 is provided with an operating arm 52 to which is connected a rod 54 extending rearward for manual operation by the operator in any usual or desired manner. An opening is provided in the side of the riser 46 and the valve B comprises a cylinder 56 fitted over the opening and provided with an apertured web 58. Fixed within cylinder 56 on the outside of web 58 is a second cylinder 60, fixed in place by means of set screws 62.

Within cylinder 56 is a piston 64 and within cylinder 60 is a piston 66, the two pistons being connected by means of a rod 68 which is surrounded, between web 58 and cylinder 66, with a coil spring 70. Openings are provided in the side of cylinder 60 in which are fixed the respective ends of tubes 73 and 74. A groove 76 is provided in piston 66 which registers with the openings in the cylinder wall in one position of the piston 66. The spring 70 normally holds the piston 66 farther out in the cylinder than shown in Figure 5 and in a position closing the openings in the side of cylinder 60.

Centrally disposed on the cross member 13 is the casting 80 which is formed with a bearing 82 for the propeller shaft 40 and a bearing 84 in which is journaled the governor shaft 86. Bevel gears 88 and 90 are fixed on the propeller shaft and governor shaft respectively and are constantly in mesh. An arm 92 extends upward from casting 80 and is bifurcated at its end for supporting the governor controlled valve, indicated generally at "C". This valve comprises a cylinder 94 clamped in the end of arm 92 and in which is reciprocable a piston 100. A cap 96 is screwed on the lower end of cylinder 94 and is provided with a central aperture which functions as a bearing in which is vertically slidable the rod 98, connected at its upper end with the piston 100. The lower end of rod 98 extends through an aperture in the governor sleeve 102 and is provided on its lower end with a disk shaped head 104.

The governor shaft 86 is formed with a cylindrical upper portion 106 in which is provided a coil spring 108 pressing against the under side of the head 104. Opposed arms 110 are provided on the upper part of the governor shaft and pivoted on each arm is a bell crank lever 112 on which is adjustable a governor ball 114. A pin 116 on the inner end of the bell crank lever 112 and extends through a slot in the sleeve 102. By this arrangement, an increase in speed of the propeller shaft 40 is transmitted to the governor shaft 86 and centrifugal force causes the levers 112 to swing outward and move sleeve 102 downward against the resistance of spring 108, thus moving piston 100 downward. Grooves 120 and 122 are provided in the piston 100 and are adapted to register, during reciprocation of the piston, with a pair of openings in the side of the cylinder 94, these openings having fixed therein the ends of tubes 72 and 124, the latter leading back to the sump of engine No. 1, as indicated in Figure 1, and the former being connected with tube 73.

Connected with the throttle valve 130 of engine No. 2 is a bell crank lever 132 to the upper arm of which is connected the forward end of a rod 134, the rear end of rod 134 being connected with an arm 136 mounted on a shaft 138 rotatably supported above the adjacent clutch housing 21. A spring 135 connects the rod 134 with the frame of the car and constantly urges said rod rearward for holding the throttle closed. Supported on a bracket 140 adjacent the carburetor of engine No. 2 is a cylinder 142 in which is reciprocable a piston 144 connected by a rod 146 with the lower arm of bell crank 132. The upper end of rod 146 is provided with a slot so that the bell crank 132 can rotate to open the throttle without upward movement of rod 146. An opening is provided in the lower portion of cylinder 142 and fixed in this opening is the end of a tube 150 which extends under engine No. 2, then rearward and across under engine No. 1 where it is connected with tube 72.

Supported on a bracket 152 connecting the two engines is a cylinder 154 in the closed end of which is fixed the end of a short tube 156 connected with tube 150. A piston 158 is reciprocable in cylinder 154 and has pivotally connected therewith a rod 160 which extends rearward and is pivotally connected with the front end of link 162 which is formed adjacent its rear end with an elongated slot 164. At its inner end shaft 138 has fixed thereto a downward extending arm 166, the lower end of which is provided with a pin extending laterally through slot 164. The inner end of shaft 23 has fixed thereto an upward extending arm 168 which is pivotally connected at an intermediate point on link 162. A foot pedal 170 is mounted on shaft 138 in the usual manner.

A spring 190 connects arm 168 with bracket 152 and constantly tends to hold the clutch disengaged. This may be dispensed with, of course, by providing a clutch that is under a spring tension tending to remain open, instead of closed as in the usual construction.

Mounted on the front end of engine No. 1 is an oil pump 180 driven from the engine in any usual manner. An inlet tube 182 connects the pump with the sump of engine No. 1 and an outlet tube 184 connects the pump with tube 72. Between tube 184 and the sump of No. 1 is a connection 186 containing a relief valve so that the pressure within the tube 184 will not rise above a certain point and so that the pump 180 may continue to operate when the system is closed.

It will be noted by the above description that the throttle and clutch of No. 1 engine are at all times manually controlled in the usual manner. With No. 1 engine running, the pump 180 causes a current of oil to be pumped through tube 184 which is connected with three branches 73, 72 and 150. Pipe 73 connects with valve B and pipe 72 connects with valve C. Valve B is controlled by the position of the throttle. With No. 1 engine running, valve B is open when the throttle is closed or nearly closed and closed when the throttle is open or almost open. Valve C is open when the propeller shaft is running slowly and when the propeller shaft is running at high speed. Between these points valve C is closed. When either of these two valves is open, no considerable pressure is built up within tube 184 and its branches. When both valves are closed, however, pressure is built up within the pipe 184 and its branches and this pressure operates through piston 158 to clutch in engine No. 2 and through piston 144 to open the throttle of engine No. 2. When one or both of the valves are opened the pressure within the pipes is released and spring 190 forces the clutch of engine No. 2 out and spring 135 causes its throttle to close.

The operation of the device will now be described. With the transmission in neutral, the clutch of No. 1 engine closed and the clutch of No. 2 engine open, the engines are started of No. 2 engine open, the engines are started in the usual manner. With the engines idling there is a high vacuum in manifold 16 and this causes pistons 66 and 68 to move inward to register groove 76 with the openings in cylinder 60, thus opening valve B. Valve C is also open since groove 122 also registers with the openings in cylinder 94, as shown in Figure 2. With the hydraulic system thus open, no pressure is developed within tube 184 by pump 180. The car is then started with No. 1 in the usual manner. As the throttle of No. 1 opens, the vacuum within the manifold 16 decreases and piston 66 moves outward to close the oil tube opening in cylinder 60, but until the speed of the propeller shaft 40 passes a certain point the oil will pass through groove 122 in piston 100. When a predetermined car speed is reached, the speed of shaft 40, and hence 86, is sufficient to cause the governor to move piston 100 downward to prevent the passage of oil through cylinder 94. The pressure within the tube 184 then acts through piston 158 to close the clutch of No. 2 and through piston 144 to open the throttle of No. 2. The car then increases in speed under the power of both engines. When a predetermined car speed has been reached, the force of the governor is sufficient to move piston 100 down far enough to register groove 120 with the openings in the cylinder, thus opening valve C, and the pressure within the tubes is permitted to lower. The force of spring 190 then disengages the clutch of engine No. 2 and spring 135 closes the throttle. The car then operates with No. 1 while No. 2 idles or may be stopped. In case No. 1 is insufficient to start the car, the operator need only push on pedal 170 when he engages the clutch No. 1. This clutches in No. 2 and opens its throttle. With the car operating with both engines, the closing of the No. 1 throttle opens valve B and, by releasing the pressure within the tubes 72 and 184, permits spring 190 to release No. 2 clutch and spring 135 to close No. 2 throttle. With the car operating at high speed with No. 1 engine alone, the closing of No. 1 throttle has no effect on No. 2 engine since pistons 66 and 64 are at once drawn in and groove 76 prevents the building up of pressure within the pipes by allowing the passage therethrough of the oil. The term engine as used herein, it will be understood is to include other sorts of prime movers having characteristics similar to those of internal combustion engines, for in its broadest aspects, my invention is clearly not limited to the specific prime mover illustrated and described. In the illustrated embodiment, the operation of No. 2 is a function of the operation of No. 1, but the function is different in each of the forward speeds. In either case the second engine will disconnect when a predetermined high speed is reached. The governor may be adjusted in the usual way so that it will open valve C at the desired car or engine speed.

I claim:

1. In an automotive vehicle including propelling means and a plurality of engines, operator controlled means for independently or simultaneously connecting said engines to said propelling means, and automatic means operated by the increase of the speed of said vehicle past a predetermined point for disconnecting one of said engines from said propelling means.

2. In an automotive vehicle including propelling means and a plurality of engines, operator controlled means for independently or simultaneously connecting said engines to said propelling means, and automatic means operated by the increase in speed of said propeller shaft past a predetermined point for connecting one of said engines with said propelling means.

3. In an automotive vehicle including propelling means and a plurality of engines, means for independently connecting said engines to said propelling means, means operated by an increase in speed of said vehicle past a predetermined point for connecting one of said engines to said propelling means, and means operated by a still further increase in speed of said vehicle for disconnecting said engine.

4. In an automotive vehicle including propelling means and a plurality of engines, means for independently connecting said engines to said propelling means, means operated by an increase in speed of said vehicle past a predetermined point for connecting one of said engines to said propelling means, and manually operable means for connecting said engine with said propelling means.

5. In an automotive vehicle including two engines and propelling means, means for independently connecting said engines with said propelling means, means for independently controlling one of said engines, including a throttle, and means operating by moving of said throttle toward closed position past a predetermined point for disconnecting said other engine from said propelling means.

6. In an automotive vehicle including propelling means, two engines supported on said vehicle and independently connectible with said propelling means, means for controlling the operation of the first engine, means for connecting said second engine to said propelling means, and means operated by an increase in the speed of said first engine past a predetermined point for disconnecting said second engine from said propelling means.

7. In an automotive vehicle including propelling means, two engines supported on said vehicle and independently connectible with said propelling means, means for independently controlling the operation of the first engine, means for manually connecting said second engine with said propelling means, and means operated by an increase in speed of said first engine past a predetermined point for disconnecting said second engine from said propelling means.

8. In combination, propelling means, two engines independently connectible with said propelling means, a conduit having a fluid supplied thereto under pressure, means for controlling the operation of said first engine including a throttle, a valve within said conduit normally held open when the throttle is closed and closed when the throttle is open, a valve in said conduit, means operated by an increase in speed of said engine past a predetermined point for closing said valve, and means operable by a rise in pressure within said conduit for connecting said second engine with said propelling means.

9. In combination, propelling means, two engines independently connectible with said propelling means, a conduit having a fluid supplied thereto under pressure, means for controlling the operation of said first engine including a throttle, a valve within said conduit normally held open when the throttle is closed and closed when the throttle is open, a valve in said conduit, means operated by an increase in speed of said engine past a predetermined point for closing said valve, means operated by a still further increase in the speed of said engine for opening said valve, and means operable by a rise in pressure within said conduit for connecting said second engine with said propelling means and operable to disconnect therefrom when said pressure is released.

10. In combination, propelling means, two engines independently connectible with said propelling means, a conduit having a fluid supplied thereto under pressure, means for controlling the operation of said first engine including a throttle, a valve within said conduit normally held open when the throttle is closed and closed when the throttle is open, a governor valve in said conduit, means for connecting said second engine with said propelling means, means operated by an increase in speed of said engine past a predetermined point for opening said governor valve, and means operable by a fall in pressure within said conduit for disconnecting said second engine from said propelling means.

11. In an automotive vehicle including propelling means, two engines supported on said vehicle and independently connectible with said propelling means, means for controlling the operation of one of said engines including a throttle, a branched conduit having a fluid supplied thereto under pressure, a valve in one branch of the conduit controlled by the operation of the throttle, a valve in another branch controlled by the speed of the engine, and means operated by the pressure resulting from the closing of said valves for connecting said second engine with said propelling means.

12. In an automotive vehicle including propelling means, two engines supported on said vehicle and independently connectible with said propelling means, means for controlling the operation of one of said engines including a throttle, a branched conduit having a fluid supplied thereto under pressure, a valve in one branch of the conduit controlled by the operation of the throttle, a valve in another branch of said conduit controlled by the speed of said engine, means operated by the pressure resulting from the closing of the valves for connecting said second engine with said propelling means, and manually operable means for connecting said engine with said propelling means.

13. An automobile provided with a plurality of internal combustion engines, propelling means, means for connecting one of the engines to the propelling means to drive the vehicle, and automatic means controlled jointly by the intake suction of one of said engines and the speed of the propelling means for controlling the connection of the other engine thereto.

14. An automobile having a plurality of internal combustion engines having air intakes, propelling means, operator controlled means for connecting one of the engines to the propelling means, and automatic means controlled jointly by the suction of one of said engines and the vehicle speed for connecting another of said engines to the propelling means when the load on the first mentioned engine reaches a predetermined amount and disconnecting the second mentioned engine from the propelling means when the load on the first mentioned engine is reduced below a predetermined minimum.

15. An automobile comprising a plurality of engines, a fluid operated system controlling the operation of one of said engines, and a fluid circulating device operated by the other of said engines for applying pressure to said fluid for operating said system, a valve in system for controlling the operation thereof, and means operated by the suction of the first mentioned engine for controlling said valve.

16. An automobile comprising a plurality of engines, a fluid operated system controlling the operation of one of said engines, and a fluid circulating device operated by the other of said engines for applying pressure to said fluid for operating said system, said automobile being provided with propelling means, a valve in said system, and means operated by said propelling means for controlling the operation of said valve.

In testimony whereof I affix my signature.

CHARLES R. SHORT.